Patented Aug. 22, 1933

1,923,625

UNITED STATES PATENT OFFICE 1,923,625

TYPEWRITING AND MULTIPLE-COPYING PROCESS

Harry Jackson, Prestwich, Manchester, England, assignor to Imperial Chemical Industries Limited, London, England No Drawing. Application July 11, 1932, Serial No. 622,015, and in Great Britain July 14, 1931

14 Claims. (Cl. 101—149)

It is well known that the colouring matters used in making type-writer ribbon inks and compositions used on duplicating papers are commonly the well known basic dyestuffs such as methyl-violet, magenta, malachite green, and it is likewise well known that typewritten documents in which such inks have been used fade on exposure to light. The methyl-violet and other dyestuffs of the triphenylmethane series.

It is also well known to obtain multiple copies of typewritten documents by taking advantage of the solubility of the dyestuffs used in making the ribbon-ink or composition used on a duplicating paper.

Thus, these dyestuffs, the most important being methyl-violet, are soluble in methylated spirits and other solvents, so that by bringing into contact a reversed print of the matter to be copied, and a fresh sheet of paper made damp with a suitable solvent, a copy is obtained, and the process can be repeated until there is insufficient ink on the original to give a legible copy. The defect of fading is however more pronounced on copies made in this way than on originals, because the colouring matter is present in relatively small quantity.

By the present invention these disadvantages are obviated and a simple process is provided of obtaining prints or copies which do not fade when exposed to light by use of the common typewriter inks. In this invention non-fading indicia are made from basic dyestuffs; said indicia being rendered nonfading by contacting them with an inorganic hetero-poly-acid. The indicia may be typewritten, printed and copied matter comprising various letters, characters and the like. This invention is particularly adapted to the production of copied matter obtainable by multiple-copying processes wherein a reversed copy is prepared and the indicia ink transferred to a damp copy-sheet.

According to the invention I impregnate the paper to be printed or the printed or copied document with a solution in a suitable solvent of a complex phosphotungstic, phosphomolybdic, phosphotungstomolybdic, or other complex hetero-poly acid containing phosphorus, tungsten, molybdenum, or silicon. (See pages 661 and 862 of "A Comprehensive Treatise of Inorganic and Theoretical Chemistry", Vol. XI by W. J. Mellor.) These complex inorganic hetero-poly-acids may be used either alone or in conjunction with an organo-hetero-poly-acid containing the radical of gallic or tannic acid, for example, the gallo-molybdic or gallotungstic acids described by Fernandes (Gazzetta Chimica Italiana, 1923, 53, 514–520). I thus obtain a print or copy which does not fade when exposed to light. As a suitable solvent I use any common solvent capable of dissolving both basic dyestuff and complex acid, e. g. methylated spirit or water.

These complex acids have been described in the literature by various investigators. In Zeit. für anorganische Chemie vol. 1, p. 431, phosphotungstic acid and phosphomolybdic acid are described. They may be represented by the respective formulæ as follows:

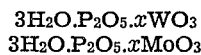

the $x$ being 18 or 24. Phosphomolybdotungstic acid is mentioned in British Patent No. 216,486. Journ. Chem. Soc. Abs. 1923, i, 1100, mentions the gallomolybdic and gallotungstic acids. Potassium digallomolybdate (the potassium salt of the acid) may be represented by the following formula:

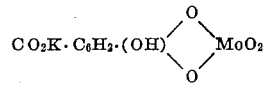

In carrying my invention into practical effect in its preferred form, I dissolve from 1 to 5% (2% is a suitable proportion) of the complex acid in methylated spirit, and utilize this solution instead of methylated spirits alone in taking the copies from a reverse original as described above. The process is carried out by means of, for example, a roller machine. Thus, a sheet of blank paper is moistened or dampened with a solution of 5 parts of phosphotungstic acid (see Zeitschrift fur anorganische Chemie, vol. 1, Page 431) in 100 parts of industrial methylated spirits by contacting it with a felt or other suitable roller moistened with the said fluid, and thereupon brought into contact with a reverse copy of the matter to be copied. An excellent copy highly resistant to fading on exposure to light is obtained. The above mentioned reversed copy may be obtained by typewriting on a suitable sheet of paper, the back of which is in contact with the coated side of a duplicating paper coated with a composition containing a basic dyestuff.

I may also use a similarly concentrated alcoholic or aqueous solution of silico-tungstic acid, or of molybdophosphotungstic acid, silicomolybdotungstic acid (compare British Specifications Nos. 216,486 and 292,253) or of one or more of these together or in conjunction with, e. g. di-gallomolybdic acid (Fernandes, loc. cit.), or molybdotannic acid, prepared as follows:—8.05 parts of tannic acid are suspended in hot water and a solution of potassium carbonate added until the solution is just alkaline to brilliant yellow paper. 7.2 parts of molybdic oxide are then gradually added to the above solution at the boil and after all has been added the temperature is kept at 100° C. for 10 minutes.

The solution used may be made from methylated spirits, as indicated above, or from commercial methanol, or other volatile water miscible solvent.

I claim:

1. In an improved method of producing non-fading indicia using inks containing basic dyestuffs, the step which comprises impregnating the copy paper with a solution of an inorganic hetero-poly-ocid comprising within the molecule an element of the class consisting of phosphorus and silicon and a metal of the class consisting of molybdenum and tungsten.

2. The improved process of claim 1, wherein an organic hetero-poly-acid containing within the molecule a metal of the class consisting of molybdenum and tungsten and an acid radical of the class consisting of gallic and tannic acid, is used in conjunction with the said inorganic hetero-poly-acid.

3. As an improved method of making non-fading copies of typewritten indicia, the improved process which comprises contacting a copy paper moistened with a solution of an inorganic hetero-poly-acid comprising within the molecule an element of the class consisting of phosphorus and silicon and a metal of the class consisting of molybdenum and tungsten, with a reverse copy made with a composition containing a basic dyestuff.

4. The process of claim 1 wherein said solution is a solution of phosphotungstic acid.

5. In the production of indicia made with inks containing basic dyestuffs of the triphenylmethane series, the improvement which comprises rendering the said indicia non-fading by contacting said indicia with a solution of an inorganic hetero-poly-acid containing within the molecule an element of the class consisting of phosphorus and silicon and a metal of the class consisting of molybdenum and tungsten.

6. The improvement of claim 5 in which said inorganic hetero-poly-acid is a complex phosphorus acid containing within the molecule a metal of the class consisting of molybdenum and tungsten.

7. The improvement of claim 5 in which said inorganic hetero-poly-acid is a phosphotungstic acid.

8. The improvement of claim 5 in which said inorganic hetero-poly-acid is a phosphomolybdic acid.

9. The improvement of claim 5 in which said inorganic hetero-poly-acid is a silicotungstic acid.

10. In the production of indicia made with inks containing basic dyestuffs of the triphenylmethane series, the improvement which comprises rendering the said indicia non-fading by contacting said indicia with a solution of an inorganic hetero-poly-acid of the class consisting of phosphotungstic, phosphomolybdic, phosphotungstomolybdic, silico-tungstic, molybdophosphotungstic and silico-molybdotungstic acids.

11. The improved process of claim 10 wherein said solution is applied to the paper prior to the application of said ink.

12. The improved process of claim 10 wherein said solution is subsequently applied to said typewritten, printed or copied matter.

13. The improved process of claim 10 wherein said contacting is simultaneous with the application of said ink.

14. In making duplicate copies of typewritten indicia from reversed copy made with coloring compositions containing basic dyes of the triphenylmethane series, wherein a moistened copy sheet is contacted with said reversed copy, the improvement which comprises moistening the copy sheet with a solution of an inorganic hetero-poly-acid containing within the molecule an element of the class consisting of phosphorus and silicon and a metal of a class consisting of molybdenum and tungsten, before contacting said sheet with the reversed copy, to produce a non-fading duplicate copy when said reversed copy and said copy sheet are contacted.

HARRY JACKSON.